(12) United States Patent
Konno et al.

(10) Patent No.: US 6,880,159 B2
(45) Date of Patent: Apr. 12, 2005

(54) DISC DRIVING APPARATUS

(75) Inventors: Youichi Konno, Tokorozawa (JP); Katsumi Ishii, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 10/421,574

(22) Filed: Apr. 22, 2003

(65) Prior Publication Data

US 2003/0214896 A1 Nov. 20, 2003

(51) Int. Cl.⁷ .............................................. G11B 17/04
(52) U.S. Cl. .................... 720/605; 369/219.1
(58) Field of Search .................. 720/605, 602, 720/689, 690; 369/75.11, 75.1, 75.21, 75.2, 77.11, 77.1, 77.21, 77.2, 219.1, 219

(56) References Cited

U.S. PATENT DOCUMENTS 5,737,305 A * 4/1998 Kayukawa .................. 369/271
5,995,468 A * 11/1999 Furukawa ................... 369/77.1
6,002,658 A * 12/1999 Aso et al. ................... 369/75.1
6,496,463 B1 * 12/2002 Ogawa et al. .............. 369/75.2
6,704,266 B1 * 3/2004 Yanagiguchi ............... 369/75.2
6,728,190 B1 * 4/2004 Huang et al. ............... 369/75.2

* cited by examiner

Primary Examiner—Angel Castro
(74) Attorney, Agent, or Firm—Ladas & Parry LLP (57) ABSTRACT

A disc driving apparatus comprises a turntable, a clamping member and a cam mechanism. A disc is to be placed on the turntable. The clamping member holds the disc between the turntable and the clamping member with a magnetic attracting force. The cam mechanism causes a relative movement between the turntable and the clamping member to move any one of them away from another thereof or move them closer to each other. The cam mechanism has a cam and a cam follower. The cam has a contour by which a variation rate of displacement of the cam follower relative to a moving amount of the cam when the turntable and the clamping member move away form each other becomes smaller than a variation rate thereof when the turntable and the clamping member move close to each other.

3 Claims, 11 Drawing Sheets

DISC DRIVING APPARATUS

BACKGROUND OF THE INVENTION

1. Field of the Invention

The present invention relates to a disc driving apparatus for driving a disc such as a CD and DVD.

2. Description of the Related Art

A disc driving apparatus includes a turntable on which a disc is to be placed and a clamping member for holding the disc between the turntable and the clamping member with a magnetic attracting force. In addition, there is provided a cam mechanism, which has a cam and a cam follower, for causing a relative movement between the turntable and the clamping member to move any one of them away from another thereof or move them closer to each other. More specifically, when the disc is to be loaded on the turntable, the cam is operated to turn in a direction to move the turntable and the clamping member away from each other through the cam follower. Then, an empty disc tray is moved away from between the turntable and the clamping member. After the disc is placed on the empty disc tray, the disc moves toward a predetermined position between the turntable and the clamping member. In this stage, the cam is operated to turn in the opposite direction to move the turntable and the clamping member close to each other. When the disc placed on the disc tray enters the predetermined position between the turntable and the clamping member, the disc tray stops moving. At the same time, the turntable and the clamping member are attracted to move close to each other, thus holding the disc between them. The turntable holds the disc and rotates so as to read information recorded on the disc by means of a pickup or record information thereon.

With respect to the cam of the cam mechanism of the conventional disc driving apparatus, a cam provided with a guide groove is usually used so that the cam follower is received in the guide grove of the cam. The above-mentioned cam follower is connected to any one of the clamping member and the turntable. When carrying out a lodging or dislodging operation of the disc, a reciprocating motion of the cam with the guide groove causes a relatively sliding motion of the cam follower in the guide groove of the cam so as to move the turntable close to the clamping member or move the former away from the latter.

The guide groove of the cam of the conventional cam mechanism is provided in the form of a slot having a constant width so that the opposite guide surfaces thereof are in parallel with each other, thus preventing the cam follower from jouncing in the guide groove. In addition, an angle between the horizontal line and each of the opposite guide surfaces of the guide groove is relatively larger, so as to provide a rapid clamping operation of the disc. As a result, heavy load is applied to a motor for driving the disc to cause problems, when moving the clamping member and the turntable away from each other. Especially, a recent demand for fast reading and writing requires enhancement in the clamping force by which the disc is held. The load applied to the motor when moving the clamping member and the turntable away from each other therefore tends to increase. Use of a large-sized motor can cope with an increased load, but being contrary to the demand for reduction in size and weight of the disc driving apparatus itself.

SUMMARY OF THE INVENTION

An object of the present invention is therefore to provide a disc driving apparatus by which the above-mentioned conventional problems can be solved.

In order to attain the aforementioned object, the disc driving apparatus of the first aspect of the present invention comprises:

a turntable on which a disc is to be placed;

a clamping member for holding the disc between said turntable and said clamping member with a magnetic attracting force; and a cam mechanism for causing a relative movement between said turntable and said clamping member to move any one of them away from another thereof or move them closer to each other, said cam mechanism comprising a cam and a cam follower, wherein:

said cam has a contour by which a variation rate of displacement of said cam follower relative to a moving amount of said cam when said turntable and said clamping member move away form each other becomes smaller than a variation rate thereof when said turntable and said clamping member move close to each other.

According to the disc driving apparatus of the first aspect of the present invention, the cam has the contour by which the variation rate of displacement of the cam follower relative to the moving amount of the cam when the turntable and the clamping member move away form each other becomes smaller than the variation rate thereof when the turntable and the clamping member move close to each other. It is therefore possible to move the turntable and the clamping member away from each other by a larger force than force applied to the cam so as to reduce load, which is applied to a power source such as a motor for driving the cam, thus avoiding increase in size and weight of the power source. In addition, there is ensured a rapid clamping operation of the disc so as to carry out a rapid switching operation to a reproducing mode or a writing mode.

In the second aspect of the present invention, said cam may have a guide groove for receiving said cam follower, said guide groove having a first guide surface and a second guide surface opposing thereto, which are inclined relative to a horizontal line by a first inclination angle and a second inclination angle, respectively, said first inclination angle being smaller than said second inclination angle, said first guide surface coming into contact with said cam follower to move said turntable and said clamping member away from each other and said second guide surface coming into contact with said cam follower to move said turntable and said clamping member close to each other.

According to the disc driving apparatus of the second aspect of the present invention, the above-mentioned first inclination angle is smaller than the above-mentioned second inclination angle. It is therefore possible not only to move the turntable and the clamping member away from each other by a larger force than force applied to the cam and provide a rapid clamping operation of the disc, but also to avoid a complicated structure of the cam mechanism, since formation of the fist and second guide surfaces, which are different from each other, in the guide groove suffices.

In the third aspect of the present invention, there may be adopted a structure in which said turntable is disposed below said clamping member; said cam follower is connected to said turntable; and said first guide surface has a predetermined length so that free fall of said turntable occurs in said guide groove.

According to the disc driving apparatus of the third aspect of the present invention, the cam follower is permitted to move away from the first guide surface of the guide groove to cause a structural element, for example, the turntable to freely fall under its own weight. It is therefore possible to rapidly move the turntable away from the clamping member, thus ensuring a rapid removal of the disc tray and the disc from a position between the turntable and the clamping member.

DETAILED DESCRIPTION OF THE PREFERRED EMBODIMENTS

Now, an embodiment of a disc driving apparatus of the present invention will be described in detail below with reference to the accompanying drawings.

As shown in FIGS. 1 to 6, the disc driving apparatus has a casing 1 covered with a cover 1a. The casing 1 has a flat rectangular parallelepiped shape extending in the horizontal direction in the embodiment. The disc driving apparatus may be used in a turned state by 90 degrees so as to extend vertically. In such a case, a clamping member, a turntable and the other structural components are disposed vertically.

A top plate 4, which has a supporting hole for supporting the clamping member 3 for a disc 2, is horizontally secured on the upper portion of the casing 1. The clamping member 3 is supported horizontally in the casing 1 so as to be fitted in the supporting hole of the top plate 4. The clamping member 3 is formed of material, which a magnet attracts. Alternatively, the clamping member 3 may be provided a magnetically attachable body formed of the same material in an embedded state. The clamping member 3 may be formed of magnetic material or be provided with a magnetic material body as embedded therein.

Figure 7:
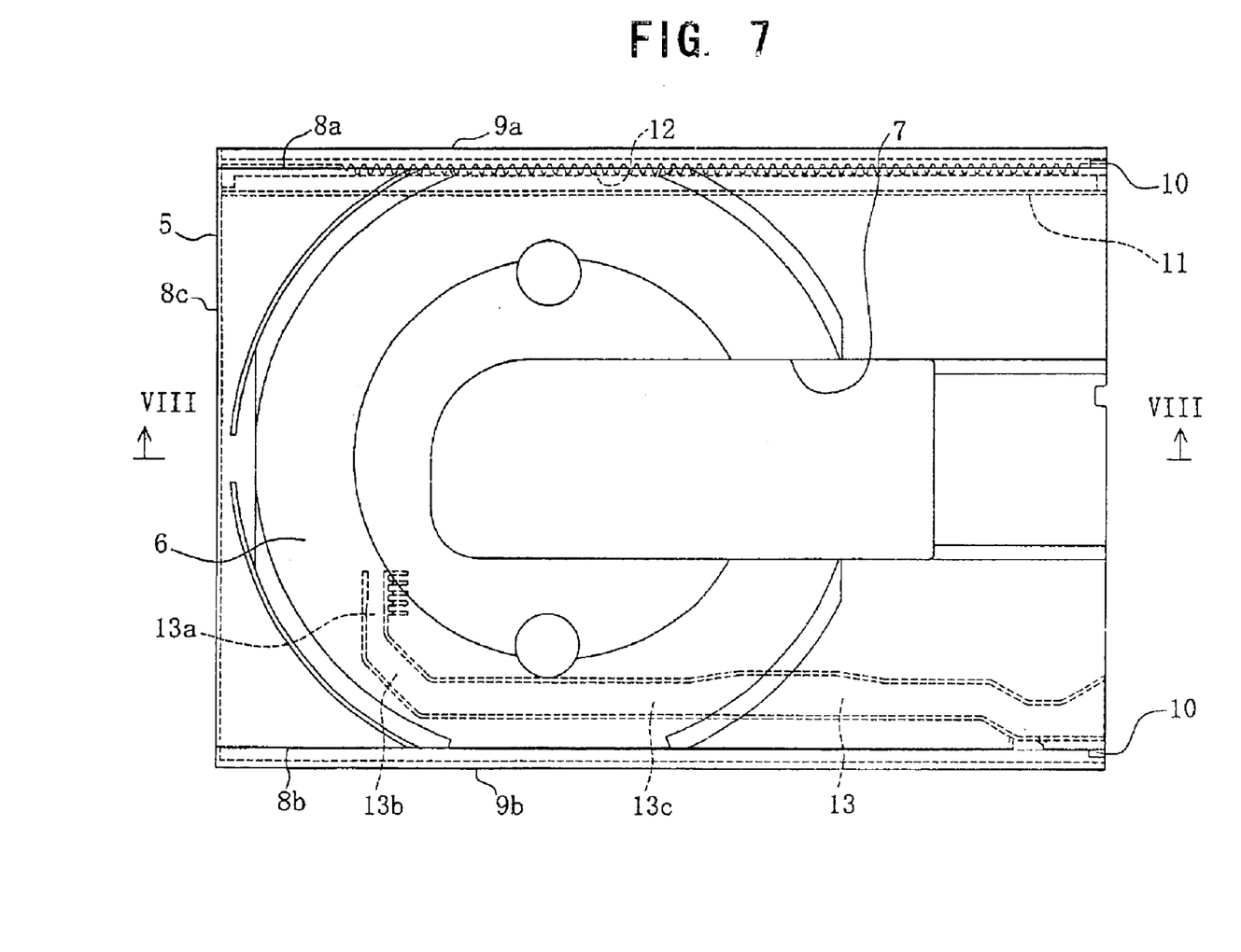
FIG. 7 is a plan view of a disc tray.
Figure 8:
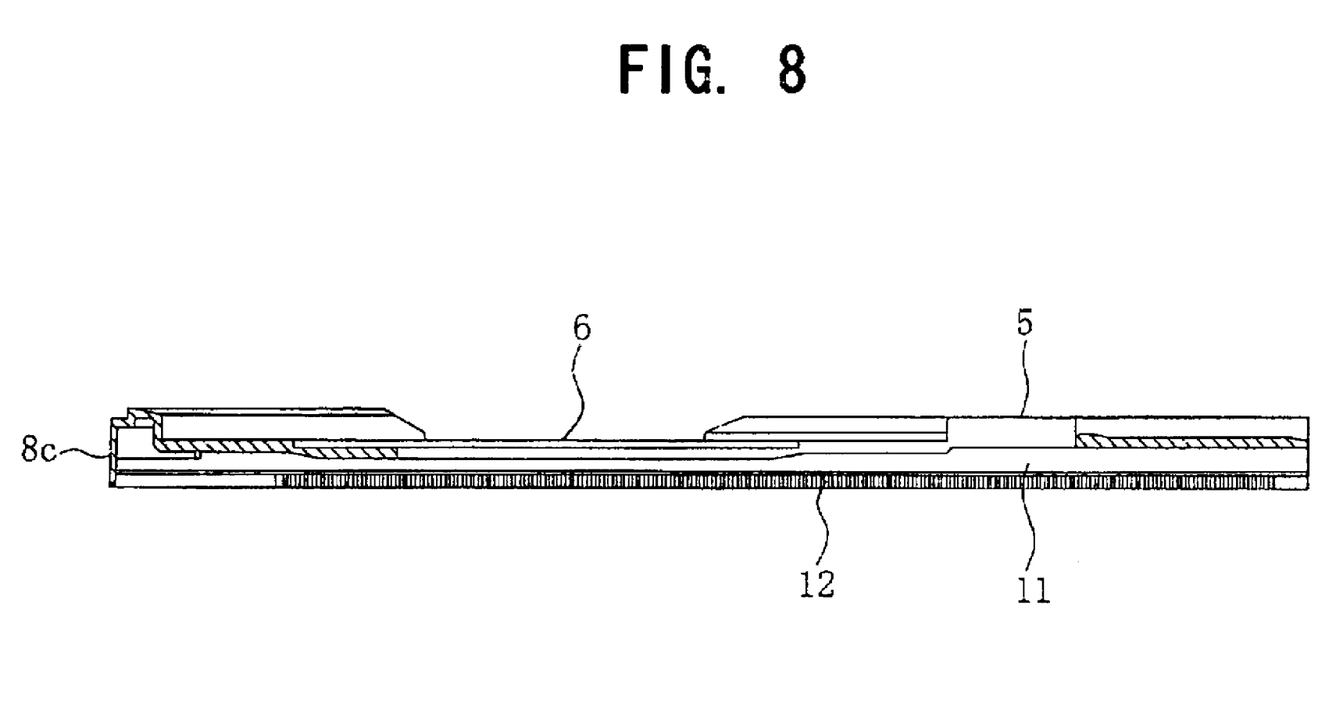
FIG. 8 is a cross-sectional view cut along the line VIII—VIII in FIG. 7.
Figure 9:
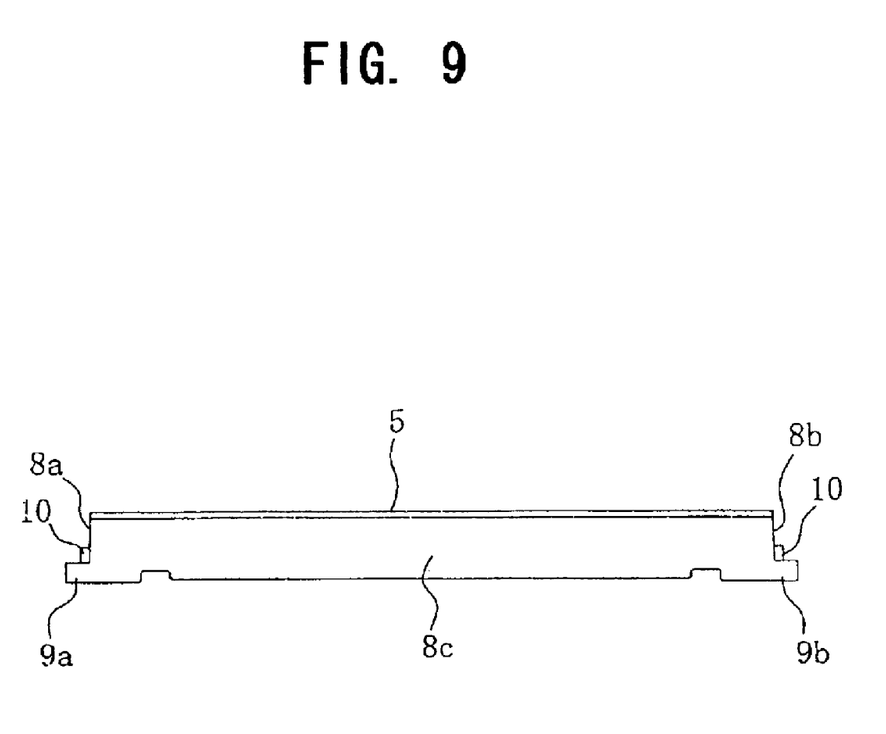
FIG. 9 is a front view of the disc tray as shown in FIG. 7.

A disc tray 5 is disposed horizontally below the top plate 4. As shown in FIGS. 7 to 9, the disc tray 5, which is a flat plate body, is provided in its central portion with a circular recess portion 6 on which the disc 2 is to be placed, and with a passage groove 7 for a pickup and the other structural elements as described later. The opposite side walls 8a, 8b extend vertically and downwardly from the opposite sides of the disc tray 5. The opposite side walls 8a, 8b are provided on their outer surfaces with slide rails 9a, 9b, respectively, which extend longitudinal direction of the disc tray 5. The opposite side walls 8a, 8b are also provided on the rear sides of their outer surfaces with stoppers 10, 10, respectively, which are provided in the form of projection. A slide wall 11 extends vertically and downwardly from the lower surface of the disc tray 5 so as to be in parallel with the left-hand side wall 8a. The left-hand side wall 8a is provided on its inner surface facing the slide wall 11 with a rack 12. The disc tray 5 is provided on its lower surface with a groove portion 13 so as to be placed along the right-hand side wall 8b. The groove portion 13, which serves as a cam, is composed of three grooves, i.e., a transverse groove section 13a, which extends from the left-hand side to the right-hand side in a place in the vicinity of a front wall 8c of the disc tray 5, a bent groove section 13b that communicates with the transverse groove section 13a and curves toward the right-hand side wall 8b and a longitudinal groove section 13c that communicates with the bent groove section 13b and extends toward the rear edge of the disc tray 5 so as to be in parallel with the right-hand side wall 8b.

Figure 1:
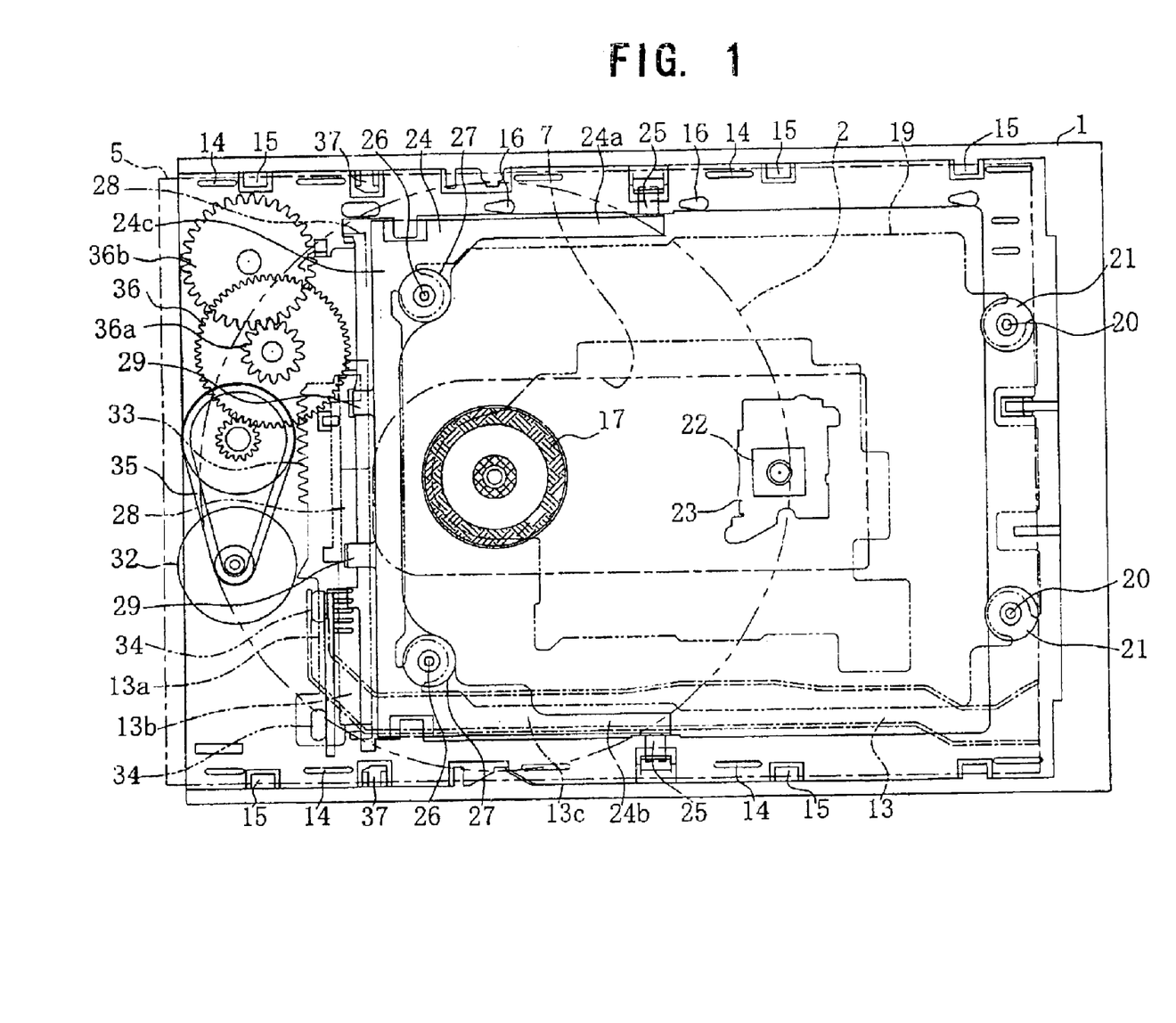
FIG. 1 is a plan view illustrating a disc driving apparatus according to the present invention.
Figure 2:
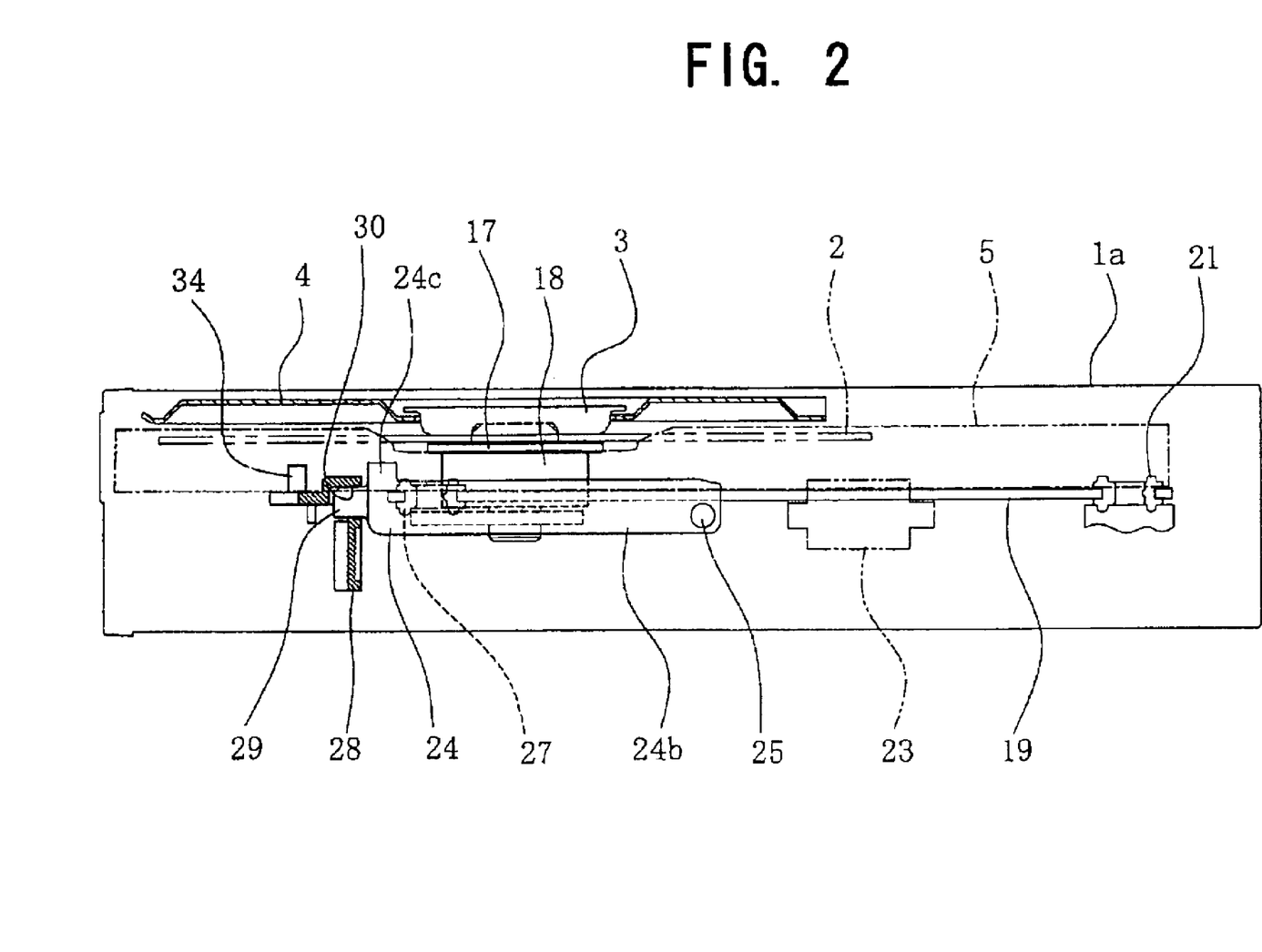
FIG. 2 is a right-hand side view of the disc driving apparatus as shown in FIG. 1, illustrating a state in which a disc is lodged.
Figure 3:
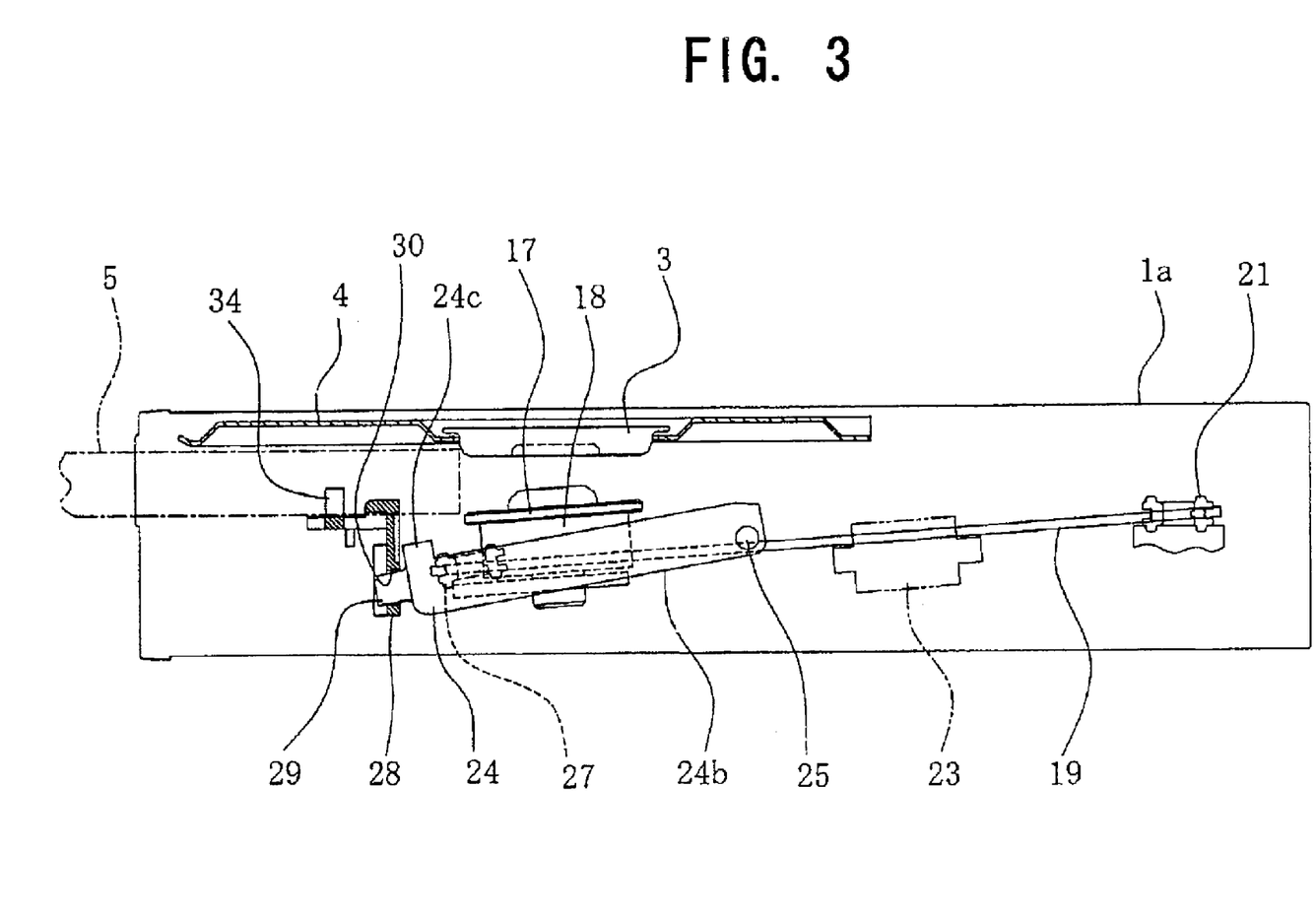
FIG. 3 is a right-hand side view of the disc driving apparatus as shown in FIG. 1, illustrating a state in which the disc is dislodged.

As shown in FIGS. 1 to 4, the casing 1 is provided with upright projections 14 for extending upward to support the disc tray 5 from below on the left-hand and right-hand sides, holding pieces 15 for holding the slide rails 9a, 9b from above and supporting projections 16 for slidably supporting the slide wall 11 in cooperation with the upright projections 14. The slide rails 9a, 9b and the slide wall 11 of the disc tray 5 are guided by the upright projections 14, the holding pieces 15 and the supporting projections 16, which are provided on the side of the casing 1, so as to be slidable in the longitudinal direction of the casing 1. As a result, the disc tray 5 projects from the casing 1 as shown in FIG. 3, and alternatively, is received completely in the casing 1 as shown in FIG. 2.

A turntable 17 is disposed below the disc tray 5 in the casing 1 so as to be movable up and down through an elevating mechanism described later, as shown in FIGS. 2 to 6. The turntable 17 has a magnet embedded therein so that, when raising the turntable 17 by the elevating mechanism, the turntable 17 and the above-described clamping member 3 are moved close to each other through a magnetic attracting force to hold the disc 2, which is placed on the disc tray 5, between the turntable 17 and the clamping member 3, thus placing the disc 2 in the predetermined position in the casing 1. A motor 18 for rotating the turntable 17 is disposed directly below the turntable 17. The motor 18 is movable up and down together with the turntable 17.

The elevating mechanism is provided, as shown in FIGS. 1 to 6, with a tilting plate 19 on which the motor 18 for supporting the turntable 17 is mounted. The tilting plate 19 is supported at its rear end on the rear side of the casing 1 through upright pins 20 and buffer members 21. Each of the buffer members 21 is a ring formed of elastic material such as soft rubber. Resilient deformation of the buffer members 21 enables the tilting plate 19 to tilt with the upright pins 20 as the fulcrum, as shown in FIGS. 2 and 3. As a result, the turntable 17 moves up to a combined state with the clamping member 3 or moves down and away from it.

In addition to the turntable 17 mounted on the tilting plate 19, a carriage 23 for a pickup 22 is also mounted on the tilting plate 19 through a carriage driving mechanism, as shown in FIGS. 1 and 2. The carriage driving mechanism is provided with a guide rod and a feed screw (not shown), which extend in the longitudinal direction of the tilting plate 19, so as to support the carriage 23. The pickup 22 for reading information from the disc 2 or writing information thereon is mounted on the carriage 23. Normal or reverse rotation of the feed screw driven by a motor causes the carriage 23 to move below the disc 2 in the radial direction thereof. A scanning operation is carried out through light irradiation from the pickup 22.

A cam mechanism as shown in FIGS. 1 to 6 causes the tilting plate 19 to tilt up and down. The upward or downward tilting motion of the tilting plate 19 causes the turntable 17 to move close to the clamping member 3 or to move away from it, respectively. Although the tilting plate 19 may be elevated directly by means of the cam mechanism, a lever member 24 is disposed between the tilting plate 19 and the cam mechanism so as to provide a smooth elevating motion of the turntable in the embodiment.

The lever member 24 has arm portions 24a, 24b, which are disposed on the opposite sides of the front portion of the tilting plate 19, and a connecting portion 24c for connecting the above-mentioned arm portions 24a, 24b, as shown in FIGS. 1 to 4. Both of the arm portions 24a, 24b are pivoted, at their rear ends, on the opposite sides of the casing 1 through supporting pins 25, so as to swing up and down. Upright pins 26 are fixed to the connecting portion 24c. The tilting plate 19 is supported at its front portion on the upright pins 26 through buffer members 27. Each of the buffer members 27 is a ring formed of elastic material such as soft rubber. Swinging the lever member 24 up and down with the supporting pins 25 as the fulcrum causes the tilting plate 19 to swing up and down with the upright pins 20 with the fulcrum in a slower manner than the lever member 24, as shown in FIGS. 2 and 3. Resilient deformation of the buffer members 21, 27 absorbs vibration caused by the swing motion of the lever member 24. This makes it possible for the turntable 17 to smoothly move up to a combined state with the clamping member 3 or smoothly move down and away from it.

The cam mechanism has a cam 28, which is movable in the transverse direction at the front side of the casing 1. Cam followers 29, which follow the cam 28, are connected to the tilting plate 19 through the lever member 24.

The cam 28 has a contour by which a variation rate of displacement of each of the cam followers 29 relative to a moving amount of the cam 28 when the turntable 17 and the clamping member 3 move away form each other becomes smaller than a variation rate thereof when the turntable 17 and the clamping member 3 move close to each other. More specifically, the cam is designed so that the turntable 17 and the clamping member 3 can be moved away from each other by a relatively small force.

In this embodiment, the cam 28, which is a direct-acting cam, is supported on the front side of the tilting plate 19 so as to be linearly movable in the transverse direction in the casing 1, as shown in FIGS. 1, and 4 to 6. The direct-acting cam may be curved along the periphery of the disc so as to be movable along an arc corresponding to the periphery of the disc. The cam 28 may be substituted by the other kind of cam such as a rotatable cam.

In addition, the cam 28, which is a grooved cam, has guide grooves 30 for receiving the cam followers 29, as shown in FIGS. 10 to 13. Each of the cam followers is provided in the form of pin, which projects forward from the connecting portion 24c.

Figure 10:
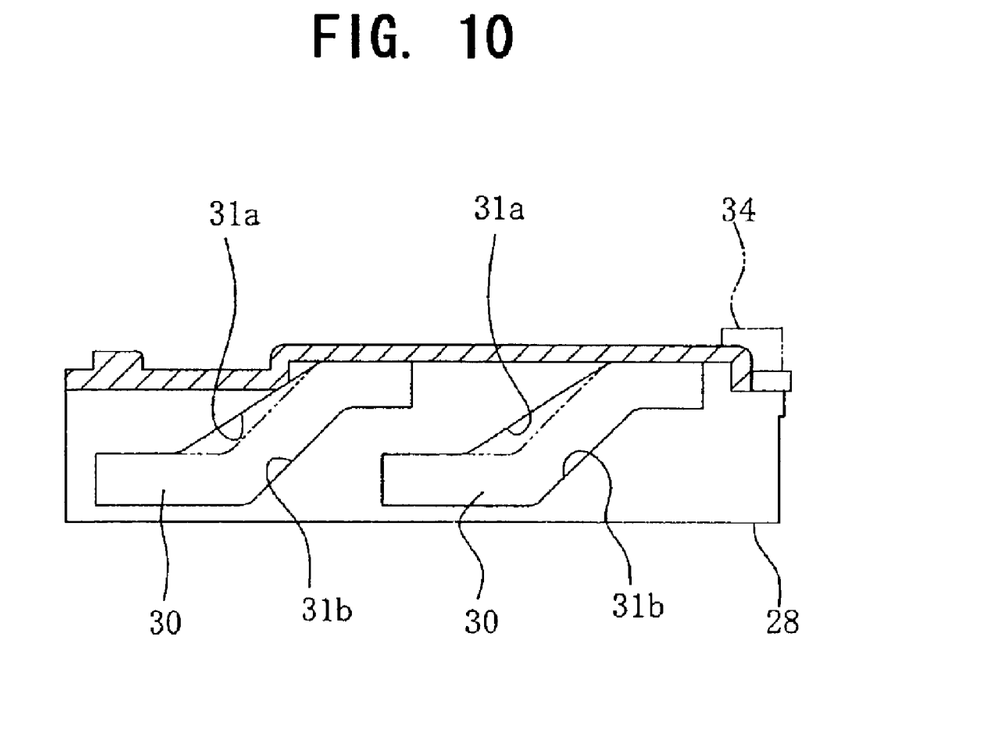
FIG. 10 is a front view of a cam.
Figure 11:
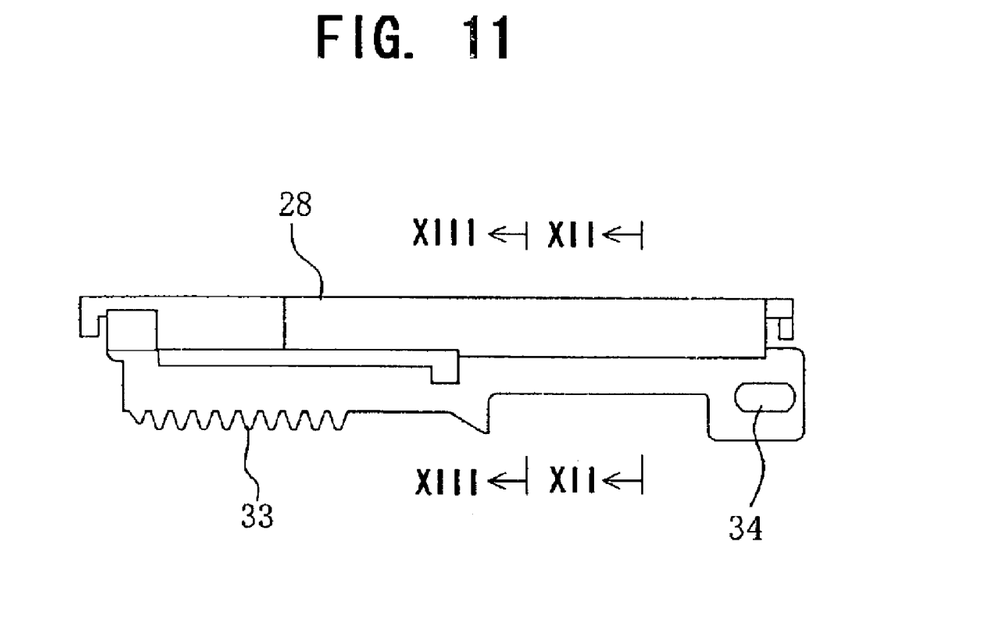
FIG. 11 is a plan view of the cam.
Figure 12:
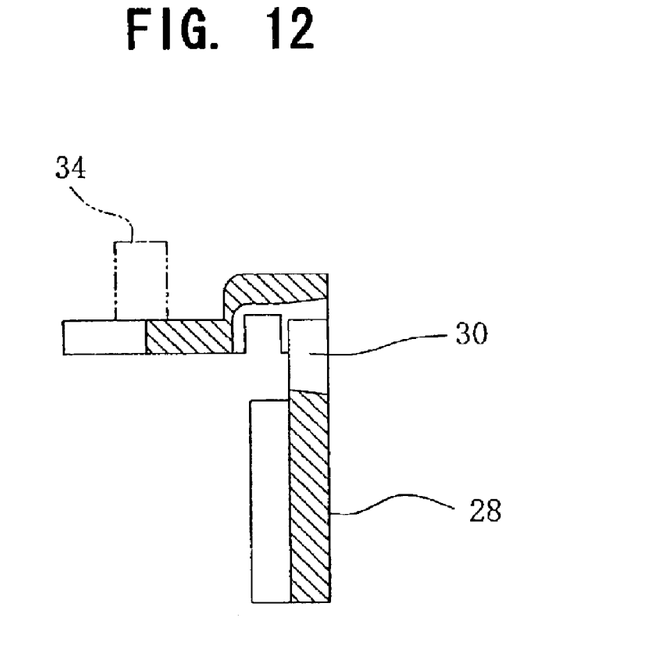
FIG. 12 is a cross-sectional view cut along the line XII—XII in FIG. 11.
Figure 13:
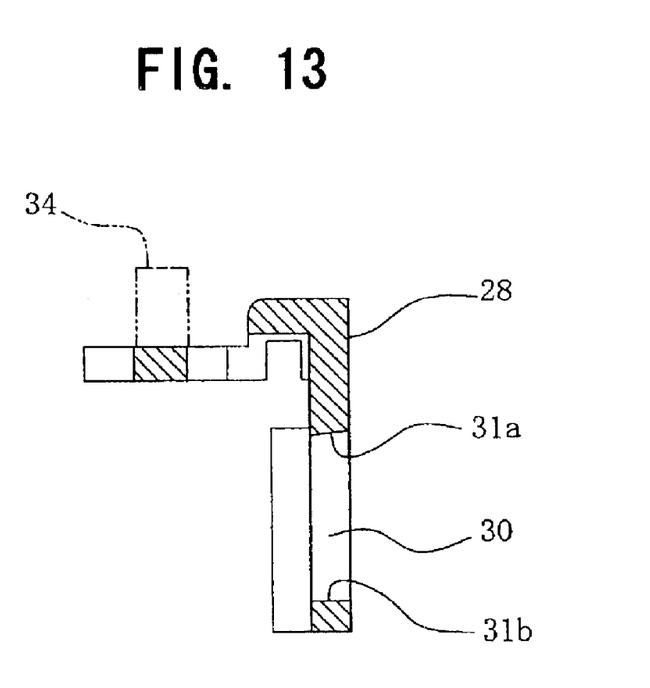
FIG. 13 is a cross-sectional view cut along the line XIII—XIII in FIG. 11.

The cam 28 is provided in the form of plate, which extends in the transverse direction of the casing 1. The cam 28 has on its central side the guide grooves 30 corresponding to the cam followers 29, respectively. Each of the guide grooves 30 is composed of upper and lower groove portions extending horizontally and an inclining groove portions connecting the upper and lower groove portions to each other, as shown in FIG. 10. Each of the upper and lower groove portions has the constant width, which is substantially identical to the diameter of the cam follower 29. Each of the above-mentioned inclining groove portions has the first and second guide surfaces, i.e., the upper guide surface 31a and the lower guide surface 31b. The upper guide surface 31a inclines relative to the horizontal line by the first inclination angle and the lower guide surface 31b inclines relative thereto by the second inclination angle. The first inclination angle is smaller than the second inclination angle. More specifically, the upper guide surface 31a comes into contact with the cam follower 29 to move the turntable 17 and the clamping member 3 away from each other. On the contrary, the lower guide surface 31b comes into contact with the cam follower 29 to move the turntable 17 and the clamping member 3 close to each other. Accordingly, the width of the inclining groove portion gradually increases from the upper side to the lower side in a different manner from the conventional groove portion having the constant width in view of avoidance of jounce as shown in a chain double-dashed line in FIG. 10. The upper and lower guide surfaces 31a, 31b extend linearly in the embodiment, but may curve.

Figure 4:
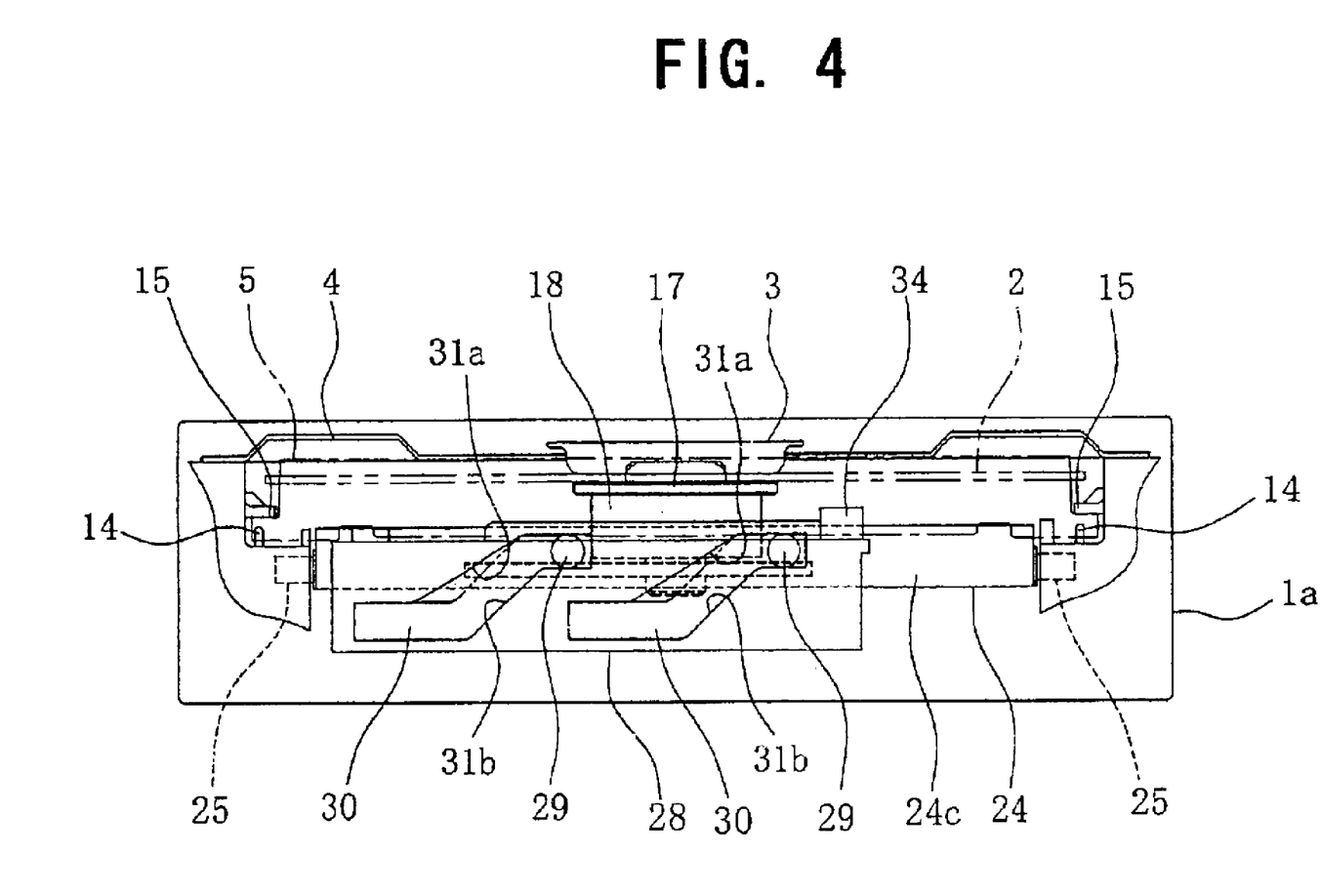
FIG. 4 is a front view of the disc driving apparatus as shown in FIG. 1, illustrating a state in which the disc is lodged.

Sliding leftward the cam 28 in the casing 1 as shown in FIG. 4 causes the cam followers 29 to be guided to the upper groove portions. As a result, the tilting plate 19 is raised through the lever member 24 to move the turntable 17 and the carriage 23 close to the clamping member 3 and the disc 2, respectively. The turntable 17 and the clamping member 3 are attracted to each other through a magnetic attracting force to hold the disc 2 between them.

Figure 5:
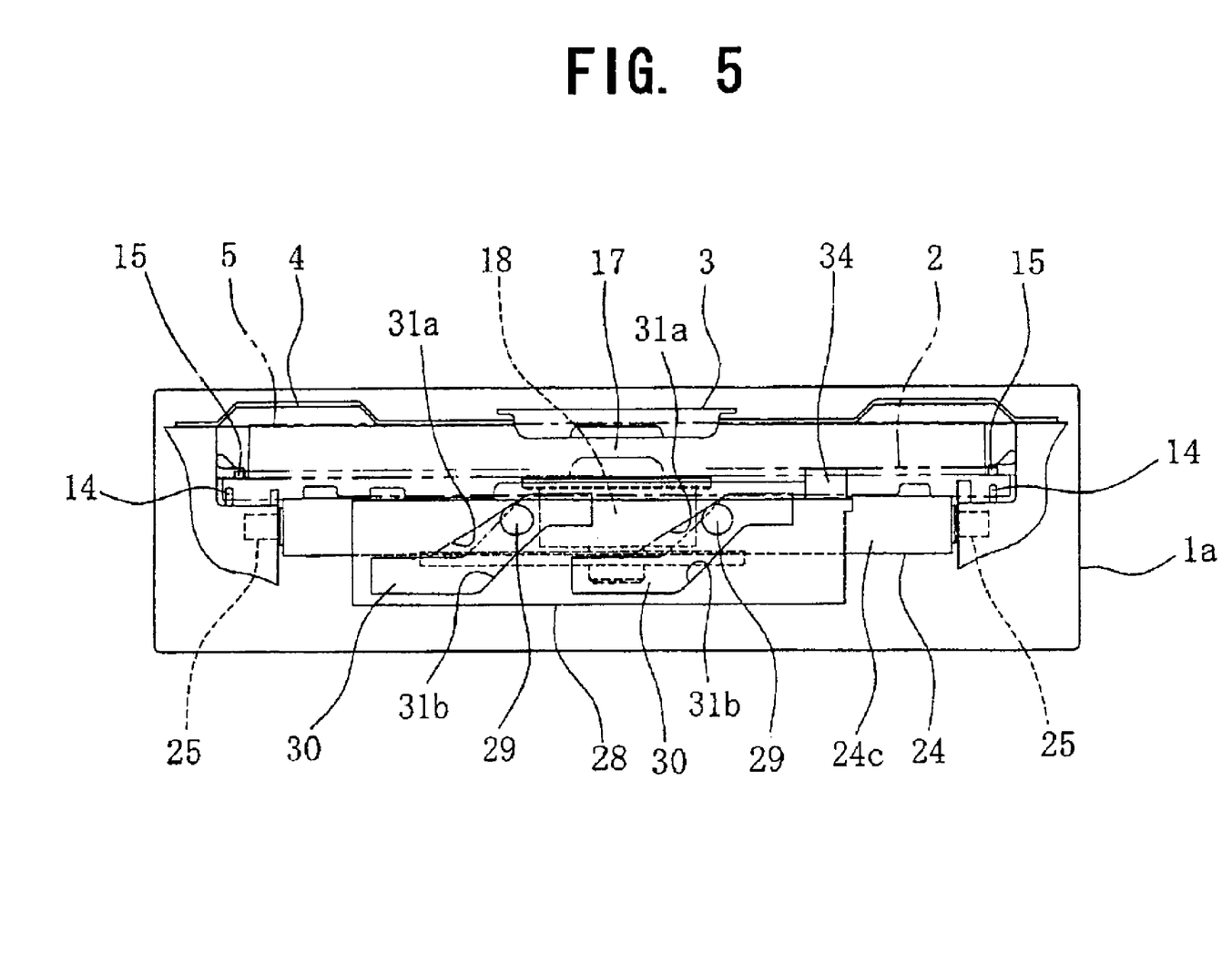
FIG. 5 is a front view of the disc driving apparatus as shown in FIG. 1, illustrating a state in which the turntable just moves away from the clamping member in order to dislodge the disc.

Sliding slightly rightward the cam 28 in the casing 1 as shown in FIG. 5 enables the upper guide surfaces 31a of the guide grooves 30 to push downward the cam followers 29 by a relatively large force. As a result, the tilting plate 19 starts to swing down through the lever member 24 to move the turntable 17 and the carriage 23 away from the clamping member 3 and the disc 2, respectively. The turntable 17 is moved away from the clamping member 3 by pulling force that is increased by the movement of the cam 28 to become larger than force applied to the cam 28, while the turntable 17 and the clamping member 3 are attracted to each other through the magnetic attracting force.

Figure 6:
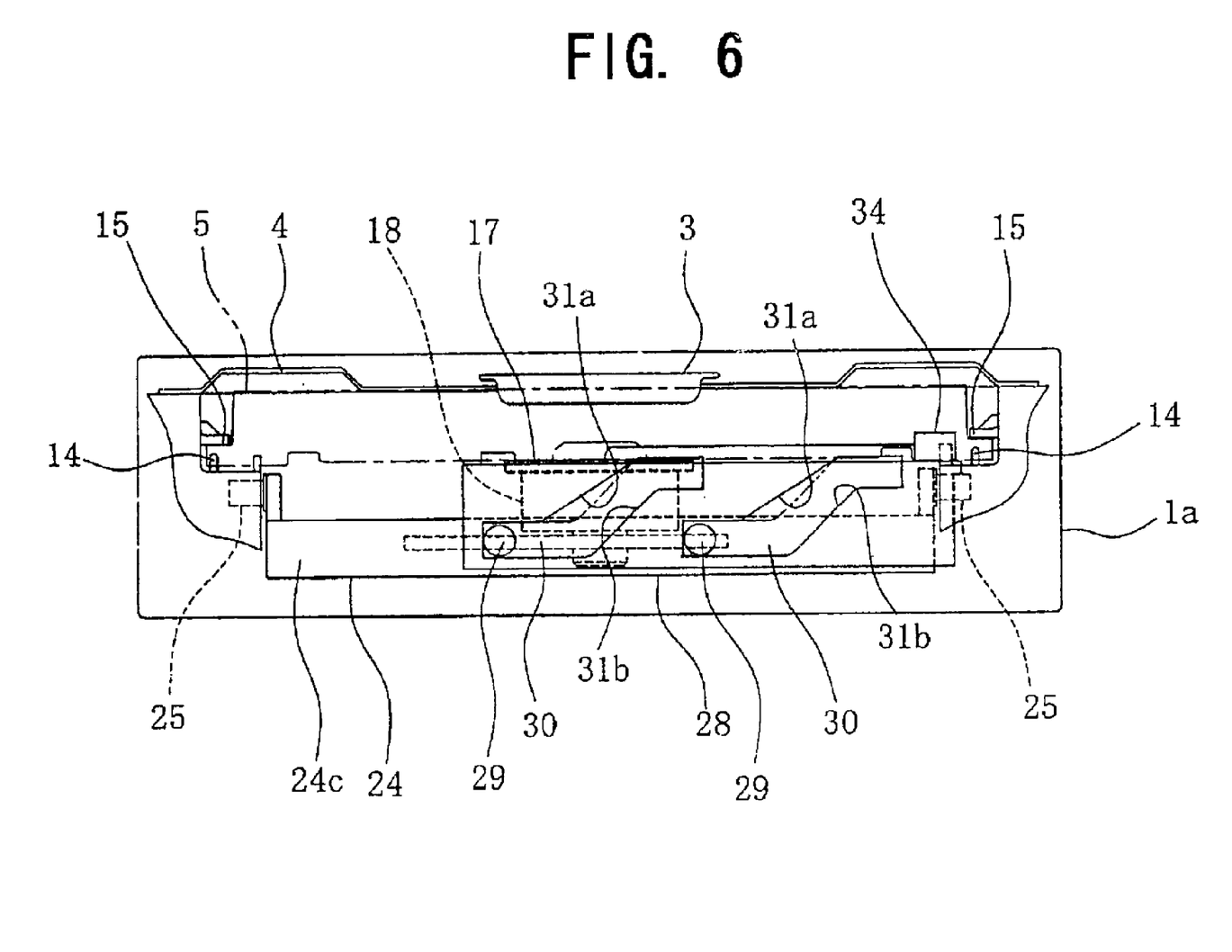
FIG. 6 is a front view of the disc driving apparatus as shown in FIG. 1, illustrating a state in which the disc has been dislodged.

Sliding further rightward the cam 28 in the casing 1 as shown in FIG. 6 causes the cam followers 29 to be guided to the lower groove portions of the guide grooves 30. As a result, the tilting plate 19 is moved to the lower position through the lever member 24 as shown in FIG. 3 so that the turntable 17 and the clamping member 3 are kept to move away from the clamping member 3 and the disc 2, respectively.

Sliding leftward the cam 28 from the state as shown in FIG. 6 to the state as shown in FIG. 4 enables the lower guide surfaces 31b of the guide grooves 30 to raise the cam followers 29. The lower guide surfaces 31b have a relatively large inclination angle relative to the horizontal line, thus making it possible to move rapidly the turntable 17 and the carriage 23 close to the clamping member 3 and the disc 2, relatively.

The upper guide surface 31a is designed to have a predetermined length so that free fall of the turntable 17 occurs in the guide groove 30. When the cam 28 starts to slide rightward as shown in FIG. 5 and a short period of time lapses, the cam followers 29 come off the upper guide surfaces 31a so as to cause occurrence of free fall of the turntable 17. Consequently, the turntable 17 rapidly moves away from the clamping member 3, without being subjected to restriction of the cam 28. It is therefore possible to remove rapidly the disc 2 from a position between the turntable 17 and the clamping member 3.

The cam 28 and the disc tray, which are operated by means of the same motor serving as the driving source, are interlocked with each other.

More specifically, the motor 32 and a power transmission unit for transmitting power from the motor 32 to each of the cam 28 and the disc tray 5 are disposed below the disc tray 5 on the front side of the casing 1, as shown in FIG. 1. The cam 28 is provided with a rack 33, which engages with a gear of the power transmission unit described later, and a projection 34, which is fitted into the above-described groove portion 13 of the disc tray 5.

The power transmission unit is composed of a belt drive mechanism 35 and a gear drive mechanism 36 so that power is transmitted from the motor 32 to the first gear of a gear train through a belt and pulleys and an intermediate gear 36a and a final gear 36b rotate at the respectively reduced number of revolutions. The final gear 36b engages with or disengages from the above-mentioned rack 12 of the disc tray 5 and the intermediate gear 36a engages with or disengages from the above-mentioned rack 33 of the cam 28.

Now, interconnecting relation between the cam 28 and the disc tray 5 will be described below.

In case where the disc tray 5 is retracted into the casing 1, the rack 12 of the disc tray 5 disengages from the final gear 36b and the cam 28 moves leftward in FIGS. 1 and 4 so that the rack 33 of the cam 28 engages with the intermediate gear 36a. In addition, swinging upward the lever member 24 and the tilting plate 19 by means of the guide groove 30 of the cam 28 through the cam followers 29 causes the turntable 17 to move up to a combined state with the clamping member 3, thus holding the disc 2 between the clamping member 3 and the turntable 17, as shown in FIG. 2. The projection 34 of the cam 28 enters the transverse groove section 13a of the groove portion 13 of the disc tray 5 so as to prevent the disc tray 5 from moving forward or rearward.

In such a state, driving the motor 32 to rotate its output shaft in the opposite direction, i.e., a disc tray-unloading direction causes the cam 28 to slide rightward through engagement of the rack 33 of the cam 28 with the intermediate gear 36a, as shown in FIG. 5, so that the upper guide surface 31a of the guide groove 30 urges the cam followers 29 to move down. The relatively small inclination angle of the upper guide surface 31a enables the force, which is applied to the cam 28 from the motor 32, to be increased. Such an increased force is transmitted to the cam followers 29. This makes it possible to move the turntable 17 away from the clamping member 3, against a relatively large magnetic attracting force applied to the turntable 17 and the clamping member 3. When the turntable 17 moves away from the clamping member 3, the turntable 17, the tilting plate 19 and the lever member 24 freely fall under their own weight until the cam followers 29 come into contact with the lower guide surfaces 31a of the guide grooves 30.

When the cam 28 starts to slide from the left-hand side to the right-hand side as mentioned above, the projection 34 of the cam 28 enters the bent groove section 13b of the groove portion 13, thus slightly pushing the disc tray 5 out of the casing 1 toward the unloading position. As a result, the rack 12 of the disc tray 5 engages with the rotating final gear 36b so as to continuously push the disc tray 5 out of the casing 1. When the disc tray 5 is drive to move toward the unloading position in this manner, the rack 33 of the cam 28 disengages from the intermediate gear 36a and the cam 28 slides rightward, under the contact sliding action between the projection 34 and the bent groove section 13b of the disc tray 5, and then stops sliding in the casing 1 as shown in FIG. 6, so that the above-mentioned projection 34 enters the longitudinal groove section 13c of the disc tray 5. The projection 34 of the cam 28 slides in the longitudinal groove section 13c, while the disc tray 5 moves to be pushed out of the casing 1. When the disc tray 5 is completely pushed out of the casing, the stopper 10 of the disc tray 5 comes into contact with the projection 37 of the casing 1, thus terminating the unloading operation of the disc tray 5. At this stage, operation of the motor 32 is stopped by means of a limit switch (not shown).

After placing the disc 2 on the disc tray 5 or carrying out a disc change operation thereon, driving the motor 32 to rotate its output shaft in a direction, i.e., a disc tray-loading direction causes the disc tray 5 to be retracted into the casing 1 through engagement of the rack 12 of the disc tray 5 with the final gear 36b. The projection 34 of the cam 28 makes a relative sliding motion in the longitudinal groove section 13c toward the bent groove section 13b, while retracting the disc tray 5 into the casing 1. After the projection 34 of the cam 28 enters the bent groove section 13b, the cam 28 slides leftward in the casing 1 so that the rack 33 of the cam 28 engages with the rotating intermediate gear 36a and at the same time, the rack 12 of the disc tray 5 disengages from the rotating final gear 36b.

Rotation of the intermediate gear 36a causes the cam 28 to slide further leftward so that the lower guide surfaces 31b of the guide grooves 30 moves down the cam followers 29. The lower guide surfaces 31b have a relatively large inclination angle relative to the horizontal line, thus making it possible to raise rapidly the turntable 17 so as to hold the disc 2 between the turntable 17 and the clamping member 3 to which the magnetic attracting force is applied. At the same time, the rear end of the disc tray 5 comes into contact with the rear end of the casing 1, thus stopping the movement of the disc tray 5. Operation of the motor 32 is stopped by means of the limit switch (not shown) and the sliding operation of the cam 28 is also stopped.

Now, operation of the disc driving apparatus having the above-described structure will be described below.

In case where the disc tray 5 is retracted into the casing 1 as shown in FIGS. 1, 2 and 4, the cam 28 is placed on the left-hand side so that the rack 33 of the cam 28 engages with the intermediate gear 36a. On the contrary, the rack 12 of the disc tray 5 disengages from the final gear 36b.

At this stage, the lever member 24 and the tilting plate 19 are kept in the raised position by means of the guide groove 30 of the cam 28 through the cam followers 29. This enables the disc 2 to be held between the turntable 17 and the clamping member 3 to which the magnetic attracting force is applied.

In such a state, the projection 34 of the cam 28 enters the transverse groove section 13a of the groove portion 13 of the disc tray 5 so as to prevent the disc tray 5 from moving forward or rearward.

In order to place the disc 2 or carrying out a disc change operation, driving the motor 32 to rotate its output shaft in the disc tray-unloading direction causes the cam 28 to start sliding rightward through engagement of the rack 33 of the cam 28 with the intermediate gear 36a.

When the cam 28 slides rightward from the position as shown in FIG. 4 to the position as shown in FIG. 5, the respective cam follower 29 comes off the upper groove portion of the guide groove 30 to enter the inclining groove portion, with the result that the upper guide surface 31a of the inclining groove portion moves the cam follower 29 down. The relatively small inclination angle of the upper guide surface 31a enables the force, which is applied to the cam 28 from the motor 32, to be increased. Such an increased force is transmitted to the cam followers 29.

As a result, the lever member 24 inclines downward with the supporting pins 25 as the fulcrum and the tilting plate 19 also inclines downward with the upright pins 26, 20 and the buffer members 27, 21, which are provided at the front and rear sides of the tilting plate 19, as the fulcrum, so as to move the turntable 17 away from the clamping member 3.

When the turntable 17 is moved away from the clamping member 3, the turntable 17, the tilting plate 19 and the lever member 24 freely fall under their own weight until the cam followers 29 come into contact with the lower guide surfaces 31b of the guide grooves 30.

When the cam 28 further slides rightward as shown in FIG. 6, the cam followers 29 enter the lower groove portions of the guide grooves 30 so that the turntable 17, the tilting plate 19 and the lever member 24 are kept in the descent position, as shown in FIG. 3.

When the cam 28 slides rightward from the position as shown in FIG. 4 to the position as shown in FIG. 5 to cause occurrence of free fall of the turntable 17, the projection 34 of the cam 28 enters the bent groove section 13b of the groove portion 13 of the disc tray 5, thus pushing slightly the disc tray 5 out of the casing 1. The cam followers 29 enter the lower groove portions of the guide grooves 30 so that the lever member 24 and the turntable 17 are kept in the predetermined position.

After pushing slightly the disc tray 5 out of the casing 1, the rack 12 of the disc tray 5 engages with the rotating final gear 36b so as to continuously push the disc tray 5 out of the casing 1.

When the disc tray 5 is drive to move toward the unloading position in this manner, the rack 33 of the cam 28 disengages from the intermediate gear 36a and the cam 28 slides rightward, under the contact sliding action between the projection 34 and the bent groove section 13b of the disc tray 5, and then stops sliding in the casing 1 as shown in FIG. 6. In such a state, the projection 34 of the cam 28 enters the longitudinal groove section 13c of the disc tray 5 and slides in the longitudinal groove section 13c, while the disc tray 5 moves to be pushed out of the casing 1.

When the disc tray 5 is completely pushed out of the casing, the stopper 10 of the disc tray 5 comes into contact with the projection 37 of the casing 1, thus terminating the unloading operation of the disc tray 5. At this stage, operation of the motor 32 is stopped by means of the limit switch (not shown).

After placing the disc 2 on the disc tray 5 or carrying out a disc change operation thereon, driving the motor 32 to rotate its output shaft in the disc tray-loading direction causes the disc tray 5 to be retracted into the casing 1 through engagement of the rack 12 of the disc tray 5 with the final gear 36b.

The projection 34 of the cam 28 makes a relative sliding motion in the longitudinal groove section 13c toward the bent groove section 13b, while retracting the disc tray 5 into the casing 1. After the projection 34 of the cam 28 enters the bent groove section 13b, the cam 28 slides leftward in the casing 1 so that the rack 33 of the cam 28 engages with the rotating intermediate gear 36a and at the same time, the rack 12 of the disc tray 5 disengages from the rotating final gear 36b.

Rotation of the intermediate gear 36a causes the cam 28 to slide further leftward so that the lower guide surfaces 31b of the guide grooves 30 moves down the cam followers 29. The lower guide surfaces 31b have a relatively large inclination angle relative to the horizontal line, thus making it possible to raise rapidly the turntable 17 so as to hold the disc 2 between the turntable 17 and the clamping member 3 to which the magnetic attracting force is applied. At the same time, the rear end of the disc tray 5 comes into contact with the rear end of the casing 1, thus stopping the movement of the disc tray 5. Operation of the motor 32 is stopped by means of the limit switch (not shown) and the sliding operation of the cam 28 is also stopped.

The disc 2 is held between the turntable 17 and the clamping member 3 and moved to a predetermined position so that the disc 2 is rotated together with the turntable by the driving of the motor 18.

Driving the motor (not shown) for the carriage driving mechanism causes the carriage 23 to move below the rotating disc 2 in the radial direction thereof so that the scanning operation is carried out through light irradiation from the pickup 22. This makes it possible to read information from the disc 2 or write information on the disc 2.

According to the present invention as described in detail, the disc driving apparatus of the present invention comprises: a turntable on which a disc is to be placed; a clamping member for holding the disc between the turntable and the clamping member with a magnetic attracting force; and a cam mechanism for causing a relative movement between the turntable and the clamping member to move any one of them away from another thereof or move them closer to each other, the cam mechanism comprising a cam and a cam follower, wherein: the cam has a contour by which a variation rate of displacement of the cam follower relative to a moving amount of the cam when the turntable and the clamping member move away form each other becomes smaller than a variation rate thereof when the turntable and the clamping member move close to each other. It is therefore possible to move the turntable and the clamping member away from each other by a larger force than force applied to the cam so as to reduce load, which is applied to a power source such as a motor for driving the cam, thus avoiding increase in size and weight of the power source. In addition, there is ensured a rapid clamping operation of the disc so as to carry out a rapid switching operation to a reproducing mode or a writing mode.

In the second aspect of the present invention, the cam has a guide groove for receiving the cam follower, the guide groove having a first guide surface and a second guide surface opposing thereto, which are inclined relative to a horizontal line by a first inclination angle and a second inclination angle, respectively, the first inclination angle being smaller than the second inclination angle, the first guide surface coming into contact with the cam follower to move the turntable and the clamping member away from each other and the second guide surface coming into contact with the cam follower to move the turntable and the clamping member close to each other. It is therefore possible not only to move the turntable and the clamping member away from each other by a larger force than force applied to the cam and provide a rapid clamping operation of the disc, but also to avoid a complicated structure of the cam mechanism, since formation of the fist and second guide surfaces, which are different from each other, in the guide groove suffices.

In the third aspect of the present invention, there is adopted a structure in which the turntable is disposed below the clamping member; the cam follower is connected to the turntable; and the first guide surface has a predetermined length so that free fall of the turntable occurs in the guide groove. It is therefore possible to rapidly move the turntable away from the clamping member, thus ensuring a rapid removal of the disc tray and the disc from a position between the turntable and the clamping member.

The entire disclosure of Japanese Patent Application No. 2002-142002 filed on May 16, 2002 including the specification, claims, drawings and summary is incorporated herein by reference in its entirety.

What is claimed is:

1. A disc driving apparatus comprising:

a turntable on which a disc is to be placed;

a clamping member for holding the disc between said turntable and said clamping member with a magnetic attracting force; and a cam mechanism for causing a relative movement between said turntable and said clamping member to move any one of them away from another thereof or move them closer to each other, said cam mechanism comprising a cam and a cam follower, wherein:

said cam has a contour by which a variation rate of displacement of said cam follower relative to a moving amount of said cam when said turntable and said clamping member move away from each other becomes smaller than a variation rate thereof when said turntable and said clamping member move close to each other.

2. The apparatus as claimed in claim 1, wherein:

said cam has a guide groove for receiving said cam follower, said guide groove having a first guide surface and a second guide surface opposing thereto, which are inclined relative to a horizontal line by a first inclination angle and a second inclination angle, respectively, said first inclination angle being smaller than said second inclination angle, said first guide surface coming into contact with said cam follower to move said turntable and said clamping member away from each other and said second guide surface coming into contact with said cam follower to move said turntable and said clamping member close to each other.

3. The apparatus as claimed in claim 2, wherein:

said turntable is disposed below said clamping member;

said cam follower is connected to said turntable; and said first guide surface has a predetermined length so that free fall of said turntable occurs in said guide groove.

* * * * *